United States Patent
Kaladgi et al.

(10) Patent No.: US 10,230,714 B2
(45) Date of Patent: Mar. 12, 2019

(54) TOKENIZED ACCOUNT INFORMATION WITH INTEGRATED AUTHENTICATION

(71) Applicant: CA, Inc., New York, NY (US)

(72) Inventors: Mohammed Mujeeb Kaladgi, Bangalore (IN); Jameel Ahmed Kaladgi, Bangalore (IN); Mohammad Faiz Usmani, Reading (GB); Ruqiya Nikhat Kaladgi, Bangalore (IN); Junaid Ahmed Jameel, Bangalore (IN)

(73) Assignee: CA, Inc., New York, NY (US)

( * ) Notice: Subject to any disclaimer, the term of this patent is extended or adjusted under 35 U.S.C. 154(b) by 204 days.

(21) Appl. No.: 15/218,927

(22) Filed: Jul. 25, 2016

(65) Prior Publication Data

US 2018/0026962 A1    Jan. 25, 2018

(51) Int. Cl.
    *H04L 9/30*     (2006.01)
    *H04L 29/06*    (2006.01)
    (Continued)

(52) U.S. Cl.
    CPC .......... *H04L 63/0807* (2013.01); *G06F 21/30* (2013.01); *G06F 21/335* (2013.01);
    (Continued)

(58) Field of Classification Search
    CPC ............... H04L 63/0807; H04L 63/061; H04L 63/0803; H04L 63/0838; G06Q 20/3278; G06Q 20/325; H04C 63/083; G06F 21/136
    See application file for complete search history.

(56) References Cited

U.S. PATENT DOCUMENTS

| 7,548,620 B2* | 6/2009 | Popp ............... H04L 9/3263 380/262 |
| 7,904,946 B1* | 3/2011 | Chu ............... H04L 63/067 726/10 |

(Continued)

FOREIGN PATENT DOCUMENTS

GB    2 419 791 A  *  3/2006  ............... H04L 9/32

OTHER PUBLICATIONS

A.M. Rossudowski et al, A security privacy aware architecture and protocol for single smart card used for multiple services, 2010, Elsevier, Computers & Security 29 (2010), 393-409 (Year: 2010).*

(Continued)

*Primary Examiner* — Luu T Pham
*Assistant Examiner* — Edward X Long
(74) *Attorney, Agent, or Firm* — Meyertons, Hood, Kivlin, Kowert & Goetzel, P.C.

(57) ABSTRACT

Techniques are disclosed relating to tokenized account information with integrated authentication. In some embodiments, a shared secret key is used for tokenization and authentication. In some embodiments, a payment device stores an encrypted version of the secret key and decrypts the secret key based on a user-provided password. In some embodiments, the payment device uses the secret key and a moving factor to generate a limited-use password. In some embodiments, the payment device uses the limited-use password to modify a first identifier of an account of the user. In some embodiments, the authentication system retrieves a stored version of the secret key and a copy of the account number using a second identifier. In some embodiments, the authentication system generates the limited-use password based on the stored secret key and a moving factor, de-tokenizes the modified first identifier, and compares the result with the retrieved copy of the account number.

15 Claims, 5 Drawing Sheets

(51) Int. Cl.
*G06F 21/33* (2013.01)
*G06F 21/43* (2013.01)
*G06F 21/30* (2013.01)

(52) U.S. Cl.
CPC .......... *G06F 21/43* (2013.01); *H04L 63/0428* (2013.01); *H04L 63/0435* (2013.01); *H04L 63/061* (2013.01); *H04L 63/083* (2013.01); *H04L 63/0838* (2013.01); *H04L 63/0846* (2013.01)

(56) References Cited

U.S. PATENT DOCUMENTS

| | | | |
|---|---|---|---|
| 8,494,959 B2 | 7/2013 | Hathaway et al. | |
| 9,621,526 B2* | 4/2017 | Abrahamson | H04L 63/065 |
| 9,665,868 B2* | 5/2017 | Varadarajan | G06F 21/31 |
| 9,742,765 B2* | 8/2017 | Toyonaga | H04L 63/0876 |
| 9,768,963 B2* | 9/2017 | Chu | H04L 9/3228 |
| 2004/0141461 A1* | 7/2004 | Zimmer | H04L 41/0663 370/216 |
| 2007/0174472 A1* | 7/2007 | Kulakowski | G06F 21/31 709/229 |
| 2007/0282756 A1* | 12/2007 | Dravenstott | G06Q 20/3823 705/72 |
| 2011/0154456 A1* | 6/2011 | MacHani | H04L 51/38 726/6 |
| 2012/0054046 A1* | 3/2012 | Albisu | G06Q 20/20 705/16 |
| 2012/0203689 A1* | 8/2012 | Parvis | G06Q 40/00 705/39 |
| 2013/0124292 A1* | 5/2013 | Juthani | G06F 21/41 705/14.26 |
| 2013/0185209 A1 | 7/2013 | Ahn | |
| 2014/0122265 A1 | 5/2014 | Mardikar et al. | |
| 2016/0259929 A1* | 9/2016 | Cash | G06Q 20/3276 |

OTHER PUBLICATIONS

Manfred Jantscher et al., Security and Authentication Primer, Auto-ID Labs White Paper WP-Hardware-025, The University of Adelaide, 1-40 (Year: 2006).*

* cited by examiner

In cryptographic camouflage embodiments, a significant number of invalid passwords will produce an invalid secret key that is in the same format as a valid secret key

TOKENIZED ACCOUNT INFORMATION WITH INTEGRATED AUTHENTICATION

BACKGROUND

Technical Field

This disclosure relates generally to computer security and more particularly to tokenized account information with integrated authentication.

Description of the Related Art

Transactions using mobile devices such as mobile phones or smart cards are becoming more and more common. Many of these transactions are payment transactions that involve secure user information such as credit card data, passwords, user identification information, etc. Security of user transactions (e.g., payment transactions) is important to protect sensitive user data. In various situations, it may be desirable to encrypt or tokenize payment account information, for example, in order to prevent it from being intercepted. Encryption typically changes the format of the data being encrypted while tokenization typically does not. Further, authentication of a user and/or payment device (e.g., when a mobile device is used to perform payments) may be needed to verify that the user is an authorized user.

SUMMARY

Techniques are disclosed relating to tokenized account information with integrated authentication. In some embodiments, a shared secret key is used for tokenization and authentication. In some embodiments, a payment device (e.g., a mobile device or a point-of-sale device) stores an encrypted version of the secret key and decrypts the secret key based on a user-provided password. In some embodiments, the payment device uses the secret key and a moving factor (such as the current time of day) to generate a limited-use password. In some embodiments, the payment device uses the limited-use password to modify a first identifier of an account of the user (e.g., a payment account number). In some embodiments, the payment device transmits the modified first identifier and a second identifier of the account to an authentication system.

In some embodiments, the authentication system retrieves a stored version of the secret key and a copy of the account number using the second identifier. In some embodiments, the authentication system generates the limited-use password based on the stored secret key and a moving factor, de-tokenizes the modified first identifier using the limited-use password, and compares the result with the retrieved copy of the account number. In some embodiments, the authentication system authenticates the user and/or uses the first account identifier for a transaction in response to a match in the comparison.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "mobile device configured to transmit an account token" is intended to cover, for example, a device that performs this function during operation, even if the device in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile device, for example, would not be considered to be "configured to" perform some specific function, although it may be "configurable to" perform that function. After appropriate programming, the mobile device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Figure 1:
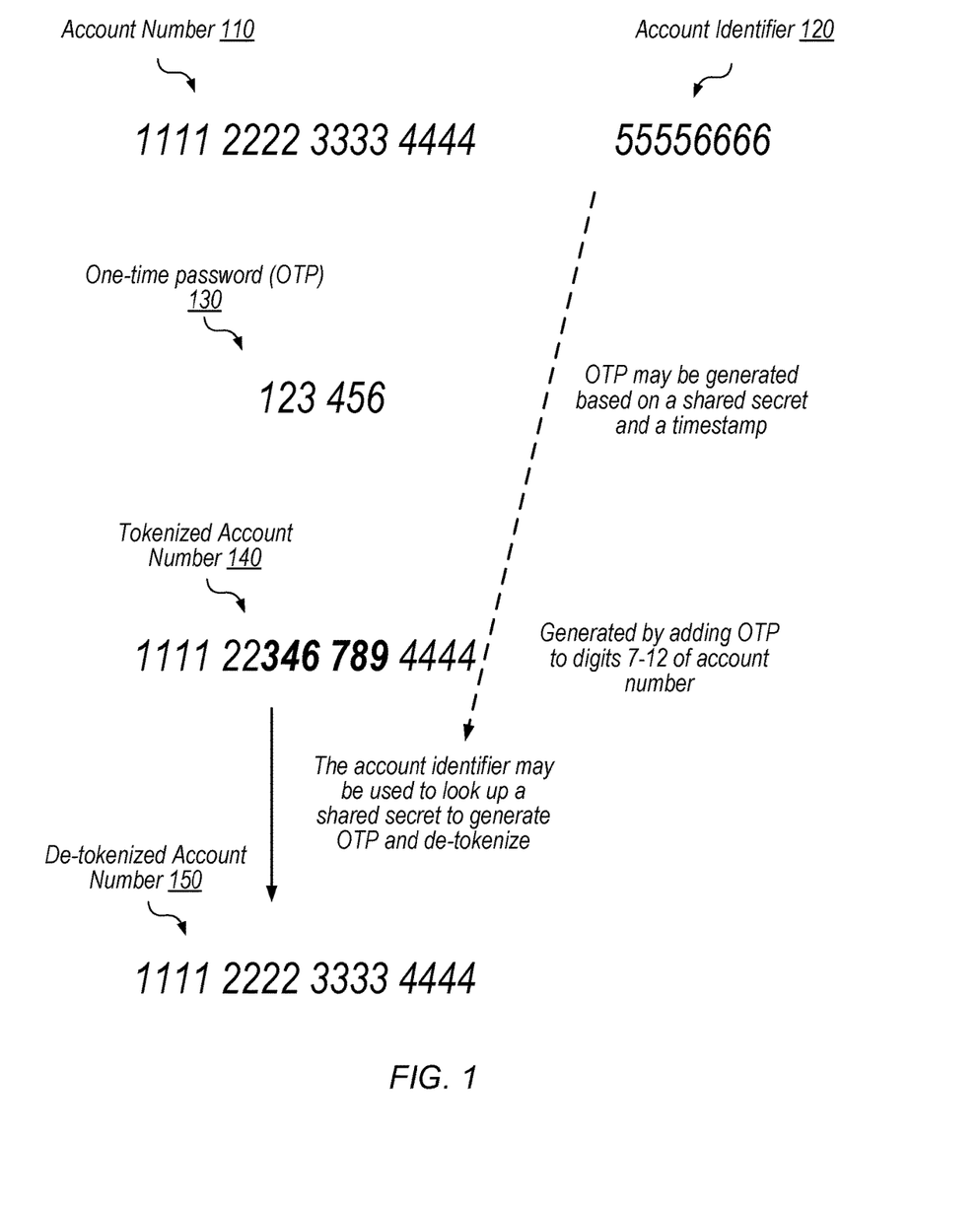
FIG. 1 is a block diagram illustrating exemplary tokenization of an account number, according to some embodiments.
Figure 2:
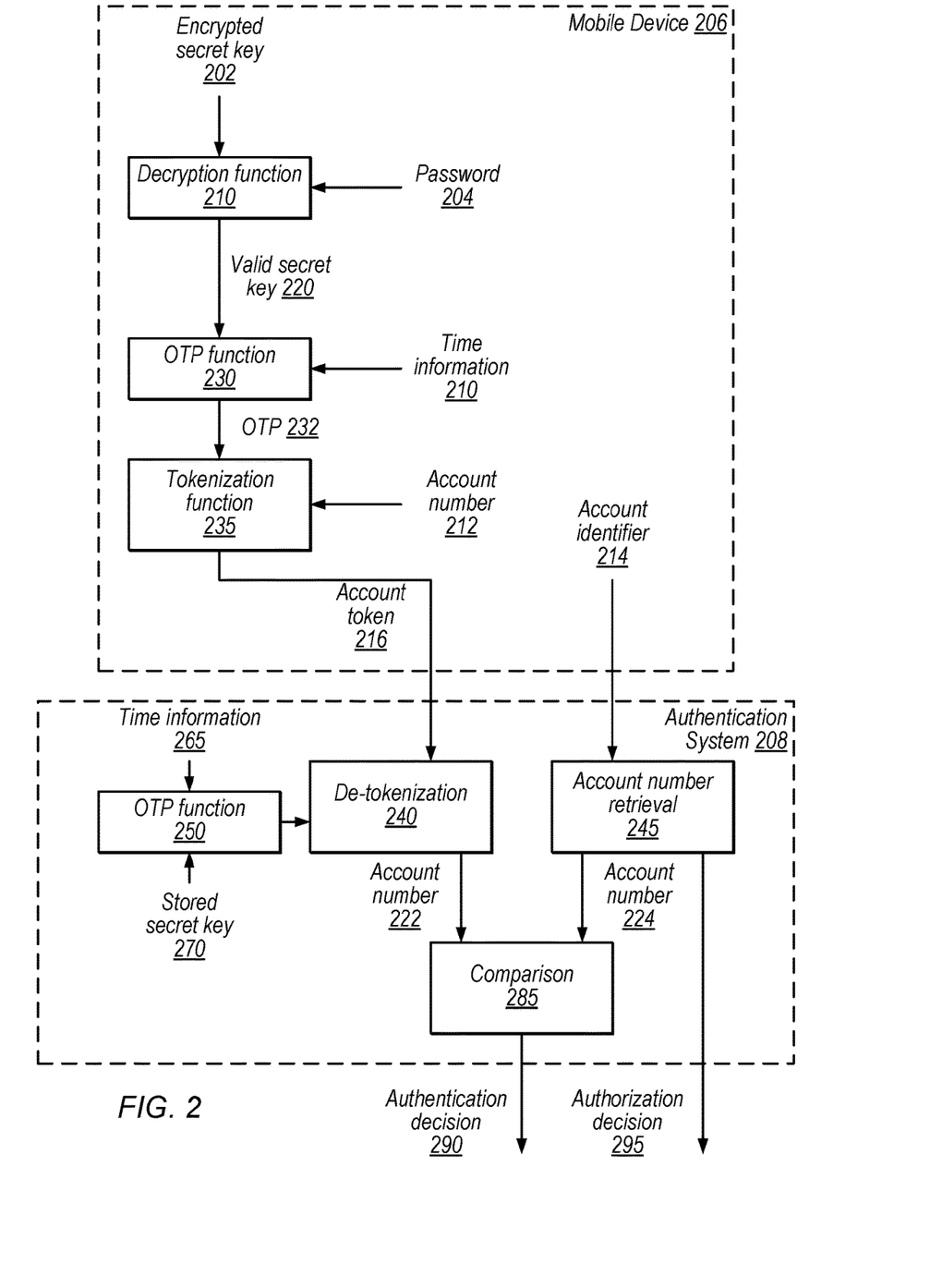
FIG. 2 is a more detailed block diagram illustrating integration of authentication and tokenization, according to some embodiments.

FIG. 1 is a diagram illustrating exemplary tokenization techniques for an account number. Although tokenization of a payment account number is shown in FIGS. 1-2, similar techniques may be used to tokenize any of various types of user information, in other embodiments.

In the illustrated embodiment, a device stores an account number 110 and an account identifier 120. In other embodiments, similar techniques may be used with other values associated with an account. The device may be a mobile phone or smart card, for example, with a mobile payment application installed. In other embodiments, the device may be a point-of-sale device that receives account number 110 and account identifier 120 from a user device. The account number 110, in the illustrated embodiment, is a 16-digit number "1111222233334444." The account identifier 120, in the illustrated embodiment, is an eight-digit number that is also used to identify the account. Additional information such as the name of the user and a card verification value (CVV) are not shown, but may also be associated with the account.

In the illustrated embodiment, the device is configured to generate a one-time password (OTP) 130. —A "one-time password" is a form of a "limited-use password," which, as used herein, refers to a password that is only valid during a predefined time interval of no more than 3 minutes. Limited-use passwords in various embodiments may have various predefined validity periods, but of limited duration needed to perform a transaction, thus distinguishing them from a more lengthy password expiration period (e.g., 60 days). A one-time password is a password that will only be accepted once during the relevant limited predefined time interval. In contrast, another type of limited-use password may be accepted multiple times during the predefined time interval. In various disclosed embodiments, the term "OTP" is used for convenience, but may be replaced with a limited-use password in any appropriate embodiments. In some embodiments, a given limited-use password may be generated using a mathematical algorithm based on the previous passwords used. In other embodiments, a limited-use password is generated based on the moving factor such as the current time of day and a shared key or a previous password, and is valid for only a limited time interval after being generated. FIG. 1 indicates that OTP 130 is generated based on a shared secret and a timestamp in the illustrated embodiments, but any of various limited-use password techniques may be used in other embodiments. In some embodiments, other moving factors such as a counter may be used in addition to and/or in place of the current time.

The device is configured to generate tokenized account number 140, in the illustrated embodiment, by adding OTP 130 to the account number. In the illustrated embodiment, the device adds OTP 130 to the seventh through twelfth digits of account number 110. In other embodiments, any of various appropriate portions of the account number may be modified, using any appropriate arithmetic operations. In some embodiments in which addition is used, the device is configured to ignore carry-over from the most significant modified digit. In other embodiments, the device may ignore carry-over from each digit. In various embodiments, using the OTP 130 to modify account number 110 generates a tokenized account number 140 that is in the same format as the original account number 110 and which retains certain information such as the routing number (which may the first through sixth digits, for example). This may prevent unauthorized individuals from intercepting the account number while still allowing routing of transactions. Further, the fact that the tokenized account number 140 may changed for each transaction (e.g., because it is based on a moving factor) may cause difficulties in malicious individuals determining the account number.

When the server receives the tokenized account number 140 and account identifier 120, in some embodiments, it uses account identifier 120 to look up an account of the user to determine the shared secret, generate the OTP 130, and de-tokenize the tokenized account number 140 to proceed with a transaction. In some embodiments, the disclosed techniques allow authentication of a user to be performed in conjunction with de-tokenizing the account number, which may eliminate a need for separate authentication and/or add an extra layer of authentication. Account identifier 120 is a new field, in some implementations, and may be transmitted using a reserved field in a transaction format, for example. Account identifier 120, in some embodiments, is not shown on a corresponding transaction instrument (e.g., a credit card), but instead is stored in a memory of a mobile device configured to perform payment transactions using the transaction instrument. In other embodiments, the account identifier 120 may be shown on the corresponding transaction instrument.

FIG. 2 is a more detailed diagram illustrating exemplary tokenization techniques, according to some embodiments. In the illustrated embodiment, certain operations are performed by mobile device 206 while other operations are performed by an authentication system 208. In other embodiments, all or a portion of the operations shown as performed by mobile device 206 may be performed by a point-of-sale system in communication with a mobile device.

Mobile device 206, in the illustrated embodiment, is configured to perform a decryption function 210, an OTP function 230, and a tokenization function 235. In the illustrated embodiment, mobile device 206 is configured to store an encrypted secret key, an account number, and an account identifier. In embodiments in which a point-of-sale system performs functions 210, 230, and 235, the point-of-sale system may receive this information from mobile device 206, e.g., via a wireless connection that uses a protocol such as a near-field communications (NFC), WiFi Direct, Bluetooth, etc. In the illustrated embodiment, mobile device 206 also receives a password 204 and time information 209 (which mobile device 206 may be configured to generate and which may be synchronized with authentication system 208). Similarly, in embodiments in which a point-of-sale system performs functions 210, 230, and 235, it may receive user input of password 204 and receive or generate time information 209.

Decryption function 210, in the illustrated embodiment, receives an encrypted secret key 202 (which may be a shared key that is also known to authentication system 208) and decrypts the encrypted secret key 202 using password 204 to generate a valid secret key 220 (a decrypted version of the secret key that is decrypted using the correct password; use of an incorrect password would result in an invalid key). In some embodiments, encrypted secret key 202 is stored using secure hardware circuitry. As used herein, the term "password" is intended to include its well-understood meaning in the art and may include personal identification numbers (PINs), passwords with various requirements (such as a certain number of alphanumeric characters, capital letters, symbols, numbers, etc.), phrases, and so on.

OTP function 230, in the illustrated embodiment, receives the valid secret key 220 and generates OTP 232 based on the valid secret key 220 and based on time information 209, which may indicate the current time of day, for example. In some embodiments, OTP function 230 uses open authentication (OATH) techniques to generate OTP 232. In these embodiments, the secret key corresponds to OATH credentials. In other embodiments, OTP 232 may be based on other types of seed information.

Tokenization function 235, in the illustrated embodiment, receives OTP 232 and account number 212 and modifies the account number 212 using the OTP 232 to generate an account token 216. Mobile device 206 then transmits a request that includes account token 216 to the authentication system 208, along with account identifier 214. The term "tokenization" refers to substituting a non-sensitive data element (a token) for a sensitive data element, where the non-sensitive data element does not have an extrinsic or exploitable meaning.

In some embodiments, one or more additional systems (not shown) may process the request prior to authentication system 208. For example, a point-of-sale device may send the request to an acquirer system which may send the request to a payment network such as VISA® or MASTERCARD®, for example. The payment network may then route the request to the appropriate issuer (e.g., a bank). The authentication system 208 may be operated by the issuer in some embodiments. In other embodiments, authentication system 208 may be operated by any of various appropriate entities in the payment chain.

Authentication system 208, in the illustrated embodiment, is configured to perform de-tokenization function 240, account number retrieval function 245, OTP function 250, and comparison 285. In the illustrated embodiment, authentication system 208 generates or receives time information 265 and maintains stored secret key 270, which is an instance or copy of valid secret key 220. Authentication system 208, in the illustrated embodiment is configured to generate an authentication decision 290 (e.g., indicating whether the user is an authorized user) and an authorization decision 295 (e.g., based on whether an account has sufficient funds to perform a transaction. In other embodiments, authentication system 208 generates decision 290 and another system generates the actual authorization decision 295.

OTP function 250 performs similarly to OTP function 23, in some embodiments. If the correct password is input to decryption function 210 and the time of day is synchronized, OTP function generates the same OTP 232 (based on the stored secret key 270) and provides it to de-tokenization function 240. If the password 204 is incorrect, in the illustrated embodiment, then the two OTPs will not match and account number 222 will not be the same as account number 212.

De-tokenization function 240 receives an OTP from OTP function 250, in the illustrated embodiment, and uses the OTP to produce account number 222. This may involve subtracting the account token 216 by subtracting the received OTP from a portion of the token, for example. De-tokenization function 240 then provides account number 222 to comparison function 285.

Account number retrieval function 245 retrieves account number 224 (which is a copy of account number 212 in some embodiments) and provides account number 224 to comparison function 285. Account identifier 214 may be a new field relative to previous payment account implementations, and is transmitted using field 48 of an iso8583 packet in some embodiments. Account identifier 214 may allow the account issuer to determine the appropriate account for the user, given that the account token 216 does not identify the account. Account identifier 214 may also be used to identify the stored secret key 270 for the account. Account identifier 214 may be separate from a bank account number or a credit card number, for example, and is not sufficient information by itself, in various embodiments, to perform a payment transaction.

In some embodiments, account number retrieval function 245 also determines whether to authorize a transaction, e.g., based on a current balance of the corresponding account and an amount of the transaction. Although payment transactions are discussed herein, similar techniques may be used for other types of transactions, such as file access transaction, for example.

Comparison function 285, in the illustrated embodiment, compares account numbers 222 and 224 and generates an authentication decision based on the comparison. In some embodiments, the user is authenticated if account numbers 222 and 224 match. In some embodiments, the account numbers will not match if the password 204 was incorrect, and authentication fails. Thus, in some embodiments, authentication of the user is integrated into tokenization of account number 212 in the comparison (because password 204 is used in the tokenization) rather than needing to be performed separately (e.g., using separate transaction fields, separate authentication devices, etc.). This may improve performance, improve security, and/or simplify implementation of computing systems for user transactions, in various embodiments.

Although various disclosed embodiments relate to payment transactions and tokenization of account numbers, similar tokenization and authentication techniques using any of various appropriate user identifiers, in other embodiments. The disclosed techniques are discussed for exemplary purposes but are not intended to limit the scope of the present disclosure.

Figure 3A:
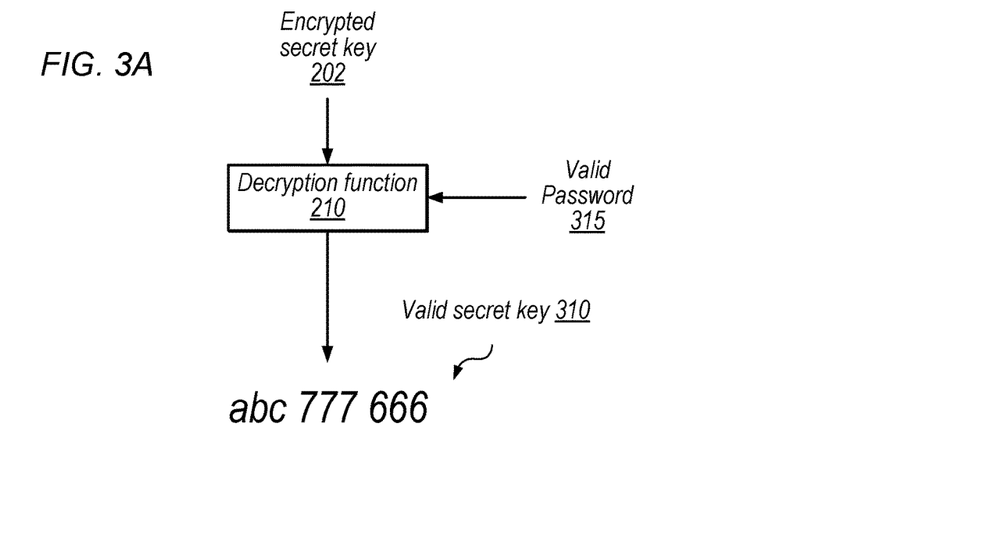
FIGS. 3A-3B are a block diagrams illustrating exemplary cryptographic camouflage techniques, according to some embodiments.
Figure 3B:
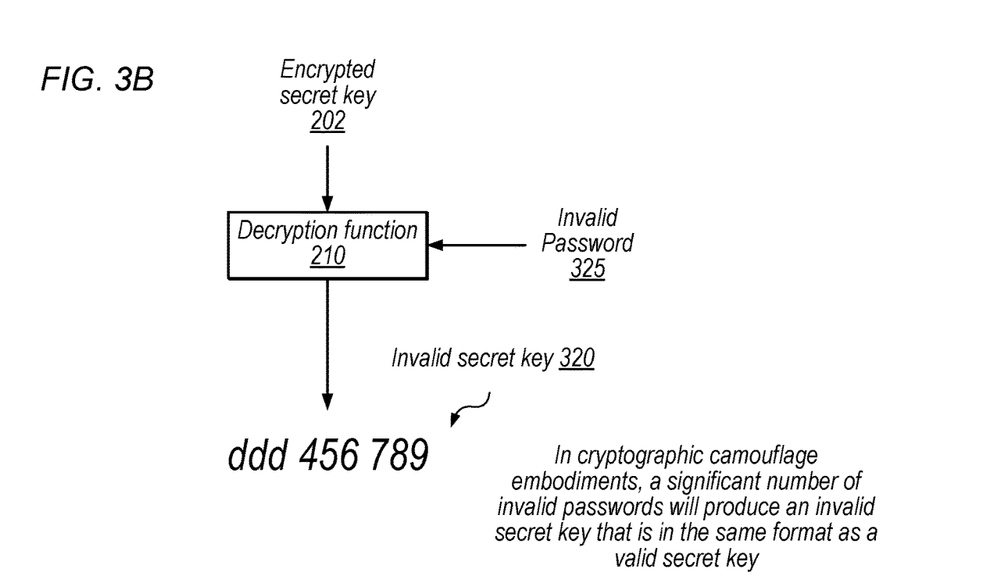

FIGS. 3A and 3B are diagrams illustrating exemplary cryptographic camouflage techniques, according to some embodiments. In some embodiments, these techniques are used to encrypt encrypted secret key 202 to avoid brute-force attacks in which a malicious individual attempts to input a large number of passwords until the correct password is found. Traditionally, if the correct password is used then the output of a decryption function will be in a desired format, which can be recognized by the attacker, while incorrect passwords result in a different output format so the attacker knows not to transmit information to the server using those passwords. Using cryptographic encryption techniques, however, may provide outputs in the correct format even when an incorrect password 204 is supplied.

FIG. 3A shows use of a valid password 315 with decryption function 210. In the illustrated embodiment, the valid secret key 310 is "abc777666." FIG. 3B shows the use of an invalid password 325 that produces an invalid secret key 320. In some embodiments, a significant number of incorrect passwords will produce invalid secret keys in the same format as valid secret key 310. Thus, certain invalid secret keys 320 will appear to be in a valid format and a malicious individual will not know whether the correct password has been used until after submitting a transaction to the authentication system 208 and receiving a notification of authentication failure. Authentication system 208, in some embodiments, is configured to freeze a corresponding account after a threshold number of incorrect attempts. Therefore, cryptographic camouflage may render guessing a password using brute force techniques much more difficult. Various exemplary techniques for performing cryptographic camouflage are discussed in U.S. Pat. No. 6,170,058, filed Dec. 23, 1997.

Integration of cryptographic camouflage into the techniques shown in FIG. 2 may further increase authentication accuracy and thereby improve the security of the overall computing system.

The particular output formats in FIGS. 3A and 3B are shown for purposes of explanation, but are not intended to limit the scope of the present disclosure. In various embodiments, any of various appropriate secret key formats may be implemented.

Exemplary Methods

Figure 4:
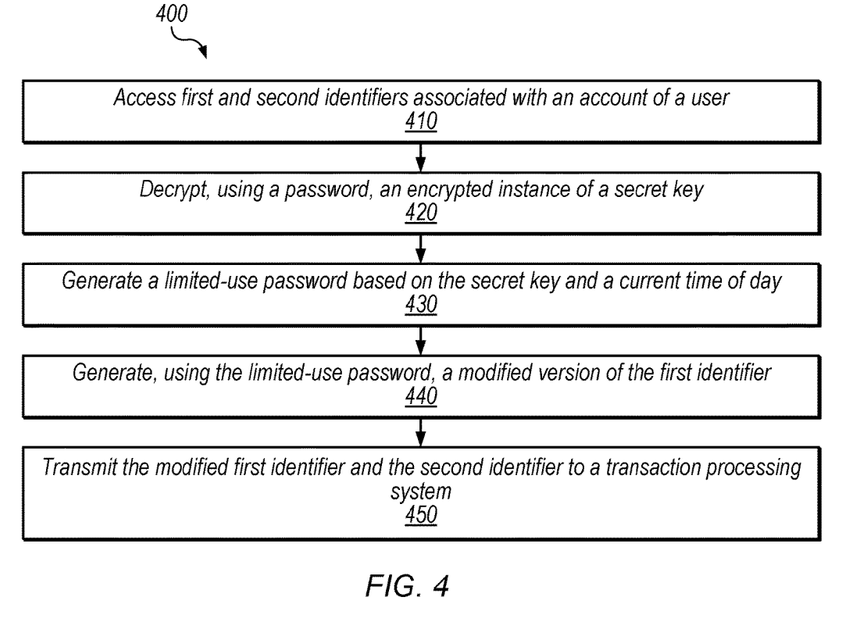
FIG. 4 is a flow diagram illustrating an exemplary method for generating a tokenized identifier, according to some embodiments.

FIG. 4 is a flow diagram illustrating a method 400 for generating a tokenized first identifier associated with a user account, according to some embodiments. The method shown in FIG. 4 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Note that in some embodiments, a point-of-sale device may perform some or all of the method elements of FIG. 4 in place of mobile device 206.

At 410, in the illustrated embodiment, mobile device 206 accesses first and second identifiers associated with an account of a user. In some embodiments, the first identifier is account number 212 and the second identifier is account identifier 214. Mobile device 206 may store the first and second identifiers using one or more memory elements. In other embodiments, a point-of-sale device may access the first and second identifiers after receiving them from a mobile payment device.

At 420, in the illustrated embodiment, mobile device 206 decrypts an encrypted instance of a secret key using a password. In some embodiments, the encrypted instance of the secret key utilizes cryptographic camouflage. The password and secret key may have any of various appropriate formats or requirements, in various embodiments.

At 430, in the illustrated embodiment, mobile device 206 generates a limited-use password based on the secret key and a current time of day. In other embodiments, mobile device 206 may use one or more other moving factors in place of and/or in addition to the current time of day.

At 440, in the illustrated embodiment, mobile device 206 generates a modified version of the first identifier using the limited-use password. In some embodiments, the modified version of the first identifier corresponds to account token 216. The modified version of the first identifier may have a format that is the same as account number 212, in some embodiments.

At 450, in the illustrated embodiment, mobile device 206 transmits the modified first identifier and the second identifier to a transaction processing system. The modified first identifier and the second identifier are sufficient information from mobile device 206, in some embodiments, to both identify the account of the user and to authenticate the user.

Figure 5:
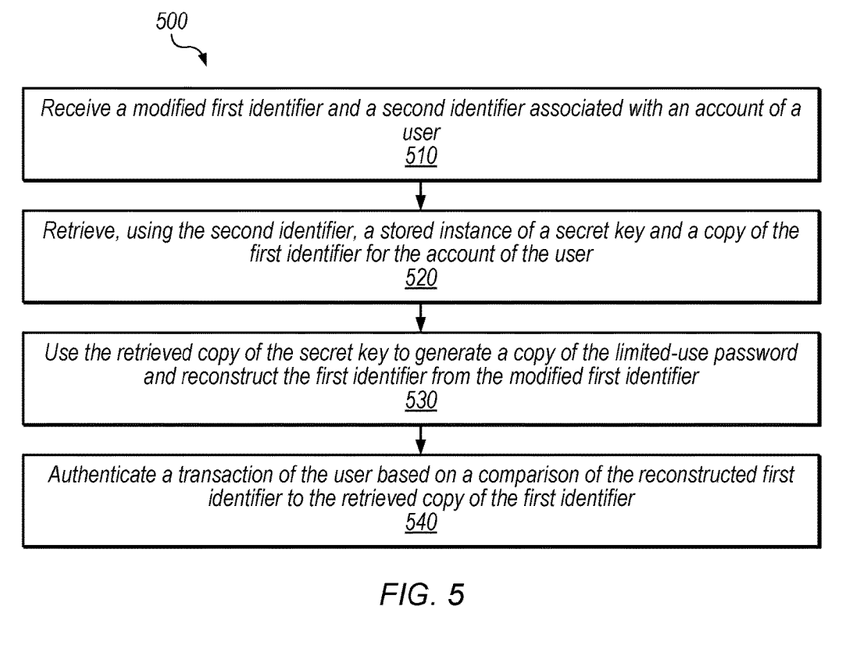
FIG. 5 is a flow diagram illustrating an exemplary method for de-tokenizing an identifier, according to some embodiments.

FIG. 5 is a flow diagram illustrating a server-side method 500 for authenticating access to a user account based on a received tokenized identifier, according to some embodiments. The method shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 510, in the illustrated embodiment, authentication system 208 receives a modified first identifier and a second identifier associated with an account of a user. In some embodiments, the received information corresponds to the information transmitted from mobile device 206 and discussed with reference to method element 450 above. In some embodiments, this information is transmitted via an acquirer system and/or a system corresponding to a payment processing network.

At 520, in the illustrated embodiment, authentication system 208 retrieves, using the second identifier, a stored instance of the secret key and a copy of the first identifier for the account of the user. For example, in some embodiments, the second identifier is account identifier 214 and is used to retrieve stored secret key 270 and account number 224.

At 530, in the illustrated embodiment, authentication system 208 uses the retrieved copy of the secret key to generate a copy of the limited-use password and reconstruct the first identifier from the modified first identifier. In some embodiments, the reconstructed first identifier is account number 222. In some embodiments, this includes subtracting the limited-use password from a portion of the modified first identifier. In other embodiments, any of various appropriate arithmetic operations may be used for de-tokenization of account token 216.

At 540, in the illustrated embodiment, authentication system 208 authenticates a transaction of the user based on a comparison of the reconstructed first identifier to the retrieved copy of the first identifier. If the reconstructed first identifier and the retrieved copy of the first identifier do not match, authentication system 208 may send an authentication failure message. If the reconstructed first identifier and the retrieved copy of the first identifier match, then authentication system 208 and/or other elements of a payment system may generate an authorization decision (e.g., whether to allow the transaction based on an account balance and an amount of the transaction).

The disclosed techniques may improve security of transactions using mobile devices and may increase the performance of the overall transaction processing system relative to traditional authentication techniques.

Exemplary Device

Figure 6:
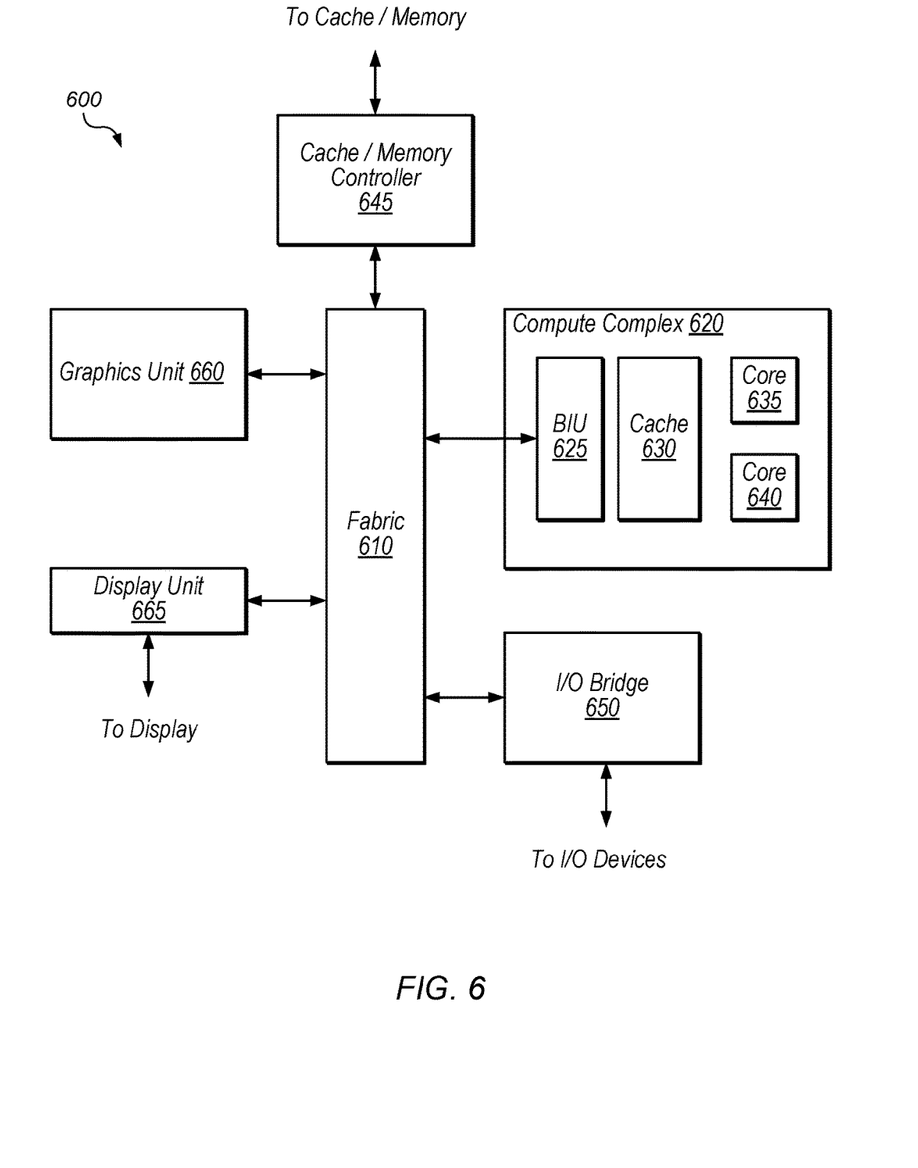
FIG. 6 is a block diagram illustrating an exemplary device, according to some embodiments.

Referring now to FIG. 6, a block diagram illustrating an exemplary embodiment of a device 600 is shown. In some embodiments, elements of device 600 may be included within a system on a chip. In some embodiments, device 600 may be included in a mobile device, which may be battery-powered. In the illustrated embodiment, device 600 includes fabric 610, compute complex 620, input/output (I/O) bridge 650, cache/memory controller 645, graphics unit 660, and display unit 665.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and/or caches. For example, compute complex 620 may include 1, 2, or 4 processor cores, or any other suitable number. In one embodiment, cache 630 is a set associative L2 cache. In some embodiments, cores 635 and/or 640 may include internal instruction and/or data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and/or memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 660 may be described as "coupled to" a memory through fabric 610 and cache/memory controller 645. In contrast, in the illustrated embodiment of FIG. 6, graphics unit 660 is "directly coupled" to fabric 610 because there are no intervening elements.

Graphics unit 680 may include one or more processors and/or one or more graphics processing units (GPU's). Graphics unit 680 may receive graphics-oriented instructions, such as OPENGL® or DIRECT3D® instructions, for example. Graphics unit 680 may execute specialized GPU instructions or perform other operations based on the received graphics-oriented instructions. Graphics unit 680 may generally be configured to process large blocks of data in parallel and may build images in a frame buffer for output to a display. Graphics unit 680 may include transform, lighting, triangle, and/or rendering engines in one or more graphics processing pipelines. Graphics unit 680 may output pixel information for display images.

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and/or low-power always-on functionality, for example. I/O bridge 650 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 650.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   one or more processing elements; and
   one or more memories having program instructions stored thereon that are executable by the one or more processing elements to:
   access first and second identifiers, each of which is individually sufficient to identify the same account of a user initiating a transaction, wherein the second identifier is different than the first identifier;
   decrypt, using a password, a first instance of a secret key, wherein the first instance of the secret key is encrypted;
   generate, based on the secret key and a current time of day, a limited-use password;
   modify the first identifier, using the limited-use password, to generate a modified version of the first identifier including to perform an arithmetic operation that uses a portion of first identifier and the limited-use password as inputs and provides a modified portion of the first identifier as an output; and
   transmit the modified first identifier and the second identifier to a transaction processing system configured to:
   retrieve, using the second identifier, a second instance of the secret key and a copy of the first identifier;
   use the second instance of the secret key to reconstruct the first identifier from the modified first identifier; and
   authenticate the transaction of the user based on a comparison of the reconstructed first identifier to the retrieved copy of the first identifier;
   wherein the apparatus is a point-of-sale device configured to receive the first and second identifiers and the first instance of the secret key from a mobile device of the user.

2. The apparatus of claim 1, wherein the first identifier is an account number of a transaction instrument and wherein the second identifier is another identifier of the transaction instrument.

3. The apparatus of claim 1, wherein the first instance of the secret key is encrypted such that attempted decryption using one or more invalid user passwords produces one or more corresponding invalid secret keys that are in the same format as a valid decryption of the secret key.

4. The apparatus of claim 1, wherein the program instructions are further executable to generate the limited-use password using open authentication (OATH) techniques.

5. The apparatus of claim 1, wherein the limited-use password is a one-time password.

6. A non-transitory computer-readable medium having instructions stored thereon that are executable by a computing device to perform operations comprising:

storing or receiving first and second identifiers, each of which is individually sufficient to identify the same account of a user initiating a transaction, wherein the second identifier is different than the first identifier;

decrypting, using a password, an encrypted first instance of a secret key;

generating, based on the secret key and a moving factor, a limited-use password;

modifying the first identifier, using the limited-use password, to generate a modified version of the first identifier, including performing an arithmetic operation that uses a portion of first identifier and the limited-use password as inputs and provides a modified portion of the first identifier as an output; and transmitting the modified first identifier and the second identifier to a transaction processing system configured to:

retrieve, using the second identifier, a second instance of the secret key and a copy of the first identifier;

use the retrieved second instance of the secret key and the moving factor to reconstruct the first identifier from the modified first identifier; and authenticate the transaction of the user based on a comparison of the reconstructed first identifier to the retrieved copy of the first identifier;

wherein the computing device is a point-of-sale device configured to receive the first and second identifiers and the first instance of the secret key from a mobile device of the user.

7. The non-transitory computer-readable medium of claim 6, wherein the first identifier is an account number of a transaction instrument and wherein the second identifier is another identifier of the transaction instrument.

8. The non-transitory computer-readable medium of claim 6, wherein the limited-use password is a one-time password.

9. The non-transitory computer-readable medium of claim 6, wherein the first instance of the secret key is encrypted using cryptographic camouflage such that attempted decryption using one or more invalid user passwords produces one or more corresponding invalid secret keys that are in the same format as a valid decryption of the secret key.

10. A method, comprising:

receiving, by a computing system, a modified first identifier and a second identifier, wherein each of the first identifier and the second identifier are individually sufficient to identify the same account of a user initiating a transaction, wherein the second identifier is different from the first identifier, and wherein the modified first identifier is generated by:

decrypting, using a password, an encrypted first instance of a secret key;

generating, based on the secret key and a current time of day, a first limited-use password; and modifying the first identifier, using the limited-use password, to generate the modified first identifier including performing an arithmetic operation that uses a portion of first identifier and the limited-use password as inputs and provides a modified portion of the first identifier as an output;

retrieving, by the computing system using the second identifier, a second instance of the secret key and a copy of the first identifier;

using, by the computing system, the retrieved second instance of the secret key to generate a second limited-use password and reconstruct the first identifier from the modified first identifier; and authenticating, by the computing system, the transaction of the user based on a comparison of the reconstructed first identifier to the retrieved copy of the first identifier;

wherein the computing system includes a point-of-sale device configured to receive the first and second identifiers and the first instance of the secret key from a mobile device of the user.

11. The method of claim 10, further comprising:

determining whether to authorize the transaction based on account information associated with the first identifier.

12. The method of claim 10, wherein the first instance of the secret key is encrypted such that attempted decryption using one or more invalid user passwords produces one or more corresponding invalid secret keys that are in the same format as a valid decryption of the secret key.

13. The method of claim 10, wherein the computing system does not use other authentication information from the user to authenticate the transaction.

14. The method of claim 10, wherein the limited-use password is generated using open authentication (OATH) techniques.

15. The method of claim 10, wherein the second identifier is stored in a particular field of an iso8583 packet.

* * * * *